US012761534B2

(12) United States Patent
Oya

(10) Patent No.: US 12,761,534 B2
(45) Date of Patent: Oct. 13, 2026

(54) IMAGE PICKUP APPARATUS HAVING HEAT RADIATION STRUCTURE

(71) Applicant: CANON KABUSHIKI KAISHA, Tokyo (JP)

(72) Inventor: Yoji Oya, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 144 days.

(21) Appl. No.: 18/813,526

(22) Filed: Aug. 23, 2024

(65) Prior Publication Data

US 2025/0076741 A1 Mar. 6, 2025

(30) Foreign Application Priority Data

Sep. 4, 2023 (JP) ................................ 2023-143083

(51) Int. Cl.
*H04N 5/335* (2011.01)
*G03B 17/55* (2021.01)

(52) U.S. Cl.
CPC .................................... *G03B 17/55* (2013.01)

(58) Field of Classification Search
CPC ...................................................... G03B 17/55
See application file for complete search history.

(56) References Cited

U.S. PATENT DOCUMENTS

| | | | | |
|---|---|---|---|---|
| 10,721,379 B2 * | 7/2020 | Yamamoto | ............... | G02B 7/02 |
| 12,457,394 B2 * | 10/2025 | Shigeta | .................. | H04N 23/52 |
| 2022/0294956 A1 * | 9/2022 | Tamura | .................. | H04N 23/53 |

FOREIGN PATENT DOCUMENTS

JP 2019009553 A 1/2019

* cited by examiner

*Primary Examiner* — Gary C Vieaux
(74) *Attorney, Agent, or Firm* — Cowan, Liebowitz & Latman, P.C.

(57) ABSTRACT

An image pickup apparatus capable of efficiently cooling a mounted recording medium. The image pickup apparatus comprises a grip portion including a protrusion portion protruding toward a subject side in an optical axis direction of the image pickup apparatus, wherein the grip portion is provided at an end portion of a main body, a medium circuit board on which a medium accommodation portion for accommodating a recording medium is mounted, wherein the medium circuit board is disposed on a side opposite to the subject side in the optical axis direction with respect to the protrusion portion, a main circuit board disposed substantially orthogonal to the optical axis, a cooling duct including a first extension portion extending parallel to the optical axis direction in the grip portion, wherein the cooling duct is thermally connected to the medium circuit board and the main circuit board.

11 Claims, 21 Drawing Sheets

IMAGE PICKUP APPARATUS HAVING HEAT RADIATION STRUCTURE

BACKGROUND OF THE INVENTION

Field of the Invention

The present invention relates to an image pickup apparatus having a heat radiation structure.

Description of the Related Art

In recent image pickup apparatuses, cooling of the inside of the apparatus is important because heat generation in a signal processing part such as an image pickup part increases with improvement in image quality. Japanese Laid-Open Patent Publication (kokai) No. 2019-9553 discloses an image pickup apparatus having a heat radiation structure that forcibly air-cools the inside of the image pickup apparatus.

In the image pickup apparatus disclosed in Japanese Laid-Open Patent Publication (kokai) No. 2019-9553, a forced air cooling flow path is built in a grip portion gripped by a shooter, and outside air sucked from an intake port on a front side of the apparatus passes through the forced air cooling flow path to exchange heat, and then is discharged from an exhaust port on a rear side of the apparatus.

In this way, a main heat source inside the apparatus is cooled.

In the future, as a writing bit rate increases due to high image quality, there is a concern about further heat generation of a recording medium, and thus the recording medium also needs to be efficiently cooled. However, Japanese Laid-Open Patent Publication (kokai) No. 2019-9553 does not mention cooling of the recording medium included in the grip portion.

Further, a cooling structure of Japanese Laid-Open Patent Publication (kokai) No. 2019-9553 is suitable in a case where a main circuit board for controlling the entire image pickup apparatus is disposed in parallel with an optical axis. However, in a case where the main circuit board is disposed orthogonal to the optical axis as in many grip integrated lens interchangeable image pickup apparatuses, it is not easy to apply the cooling structure mentioned above.

SUMMARY OF THE INVENTION

The present invention provides an image pickup apparatus capable of efficiently cooling a mounted recording medium.

Accordingly, the present invention provides an image pickup apparatus comprising a grip portion including a protrusion portion protruding toward a subject side in an optical axis direction of the image pickup apparatus, the grip portion being provided at an end portion of a main body, a medium circuit board on which a medium accommodation portion for accommodating a recording medium is mounted, the medium circuit board being disposed on a side opposite to the subject side in the optical axis direction with respect to the protrusion portion, a main circuit board disposed substantially orthogonal to the optical axis, a cooling duct including a first extension portion extending parallel to the optical axis direction in the grip portion, the cooling duct being thermally connected to the medium circuit board and the main circuit board, and an air cooling fan configured to introduce air into the cooling duct.

According to the present invention, a recording medium mounted on an image pickup apparatus can be efficiently cooled.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1A:
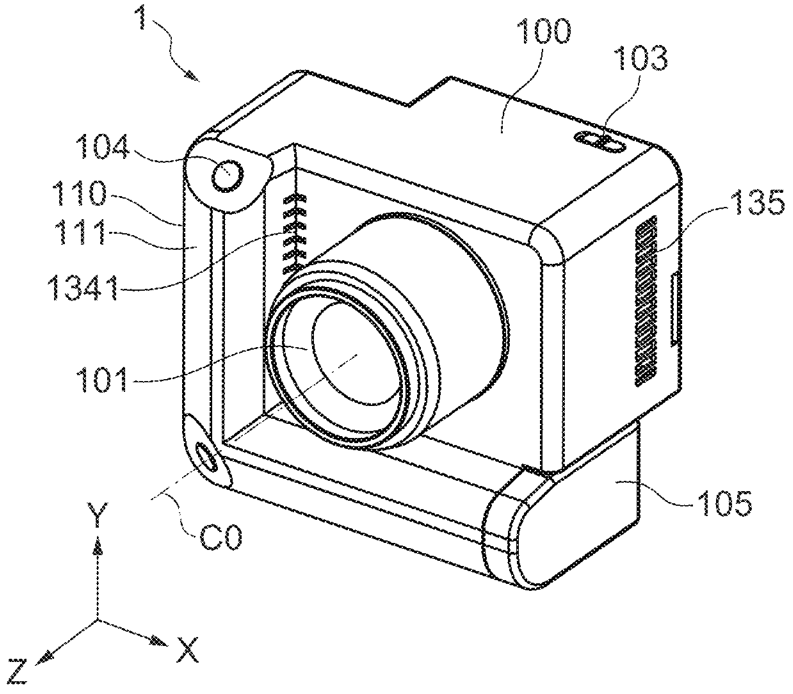
FIGS. 1A and 1B are perspective views of an image pickup apparatus according to a first embodiment.
Figure 1B:
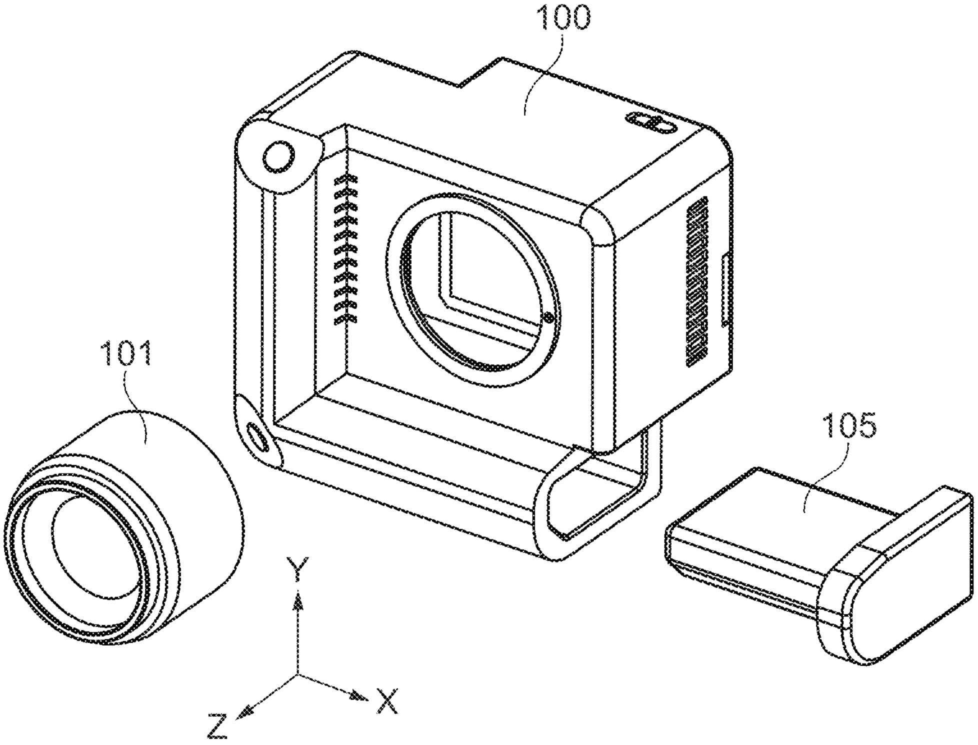

FIGS. 1A and 1B are perspective views of an image pickup apparatus 1 according to a first embodiment of the present invention. The image pickup apparatus 1 is a camera in which a lens 101 and a battery 105 are detachable from an apparatus main body (hereinafter, simply referred to as the "main body") 100. An optical axis of the image pickup apparatus 1 is defined as C0.

FIG. 1A shows a state in which the lens 101 and the battery 105 are attached to the main body 100. FIG. 1B shows a state in which the lens 101 and the battery 105 are removed from the main body 100.

Each direction used for description is defined using X, Y, and Z-coordinate axes shown in the drawings. Here, for convenience, the subject side in a direction parallel to the optical axis C0 is defined as "front". The optical axis C0 and a Z direction are parallel. For example, in FIGS. 1A and 1B, a +Y direction is an upward direction, a −Y direction is a downward direction, a +Z direction is a forward direction, and the −Z direction is a rearward direction. The +X direction is a rightward direction as viewed from the subject side, and the −X direction is a leftward direction as viewed from the subject side. Therefore, FIG. 1A is a front-side perspective view of the image pickup apparatus 1, and FIG. 1B is a front-side exploded perspective view of the image pickup apparatus 1.

Figure 2A:
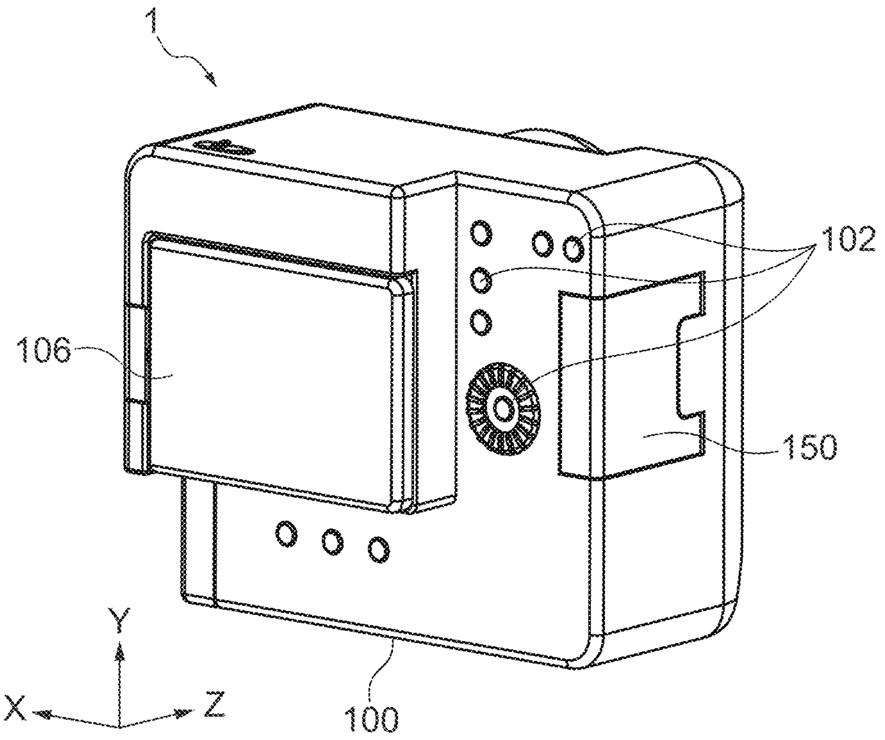
FIGS. 2A and 2B are rear-side perspective views of the image pickup apparatus.
Figure 2B:
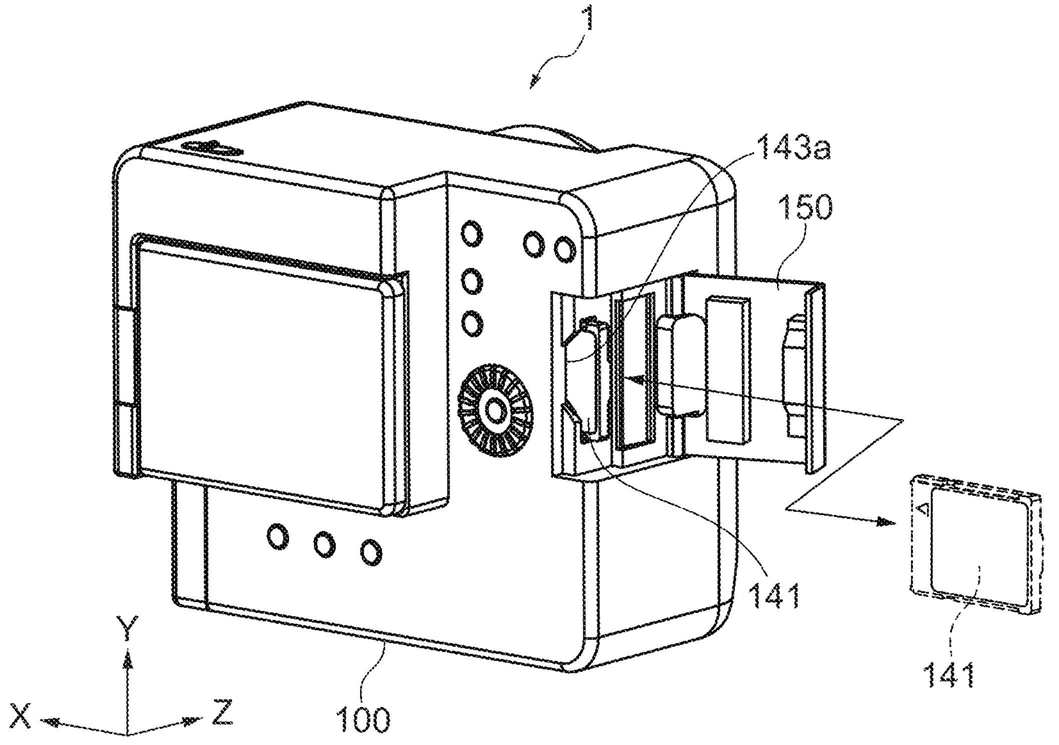

FIGS. 2A and 2B are rear-side perspective views of the image pickup apparatus 1. A medium lid 150 is attached to the main body 100 so as to be openable and closable. FIG. 2A shows a state in which the medium lid 150 is closed with respect to the main body 100. FIG. 2B shows a state in which the medium lid 150 is opened with respect to the main body 100.

As shown in FIGS. 1A and 1B, a power switch 103 for operating ON/OFF of a power supply, and a shooting button 104 for operating start/stop of still image shooting or moving image shooting are disposed in an upper portion of the main body 100. In a bottom portion of the main body 100, the battery 105 that supplies power for operating the image pickup apparatus 1 is detachably accommodated in the main body 100. A grip portion 110 to be gripped by a shooter is provided at an end portion on the −X side of the main body 100. The grip portion 110 has a protrusion portion 111 protruding toward the subject side (front side). The protrusion portion 111 is a portion on which a user hooks a finger.

On the front side of the main body 100, an intake port 1341 that sucks (introduces) cold outside air into the main body 100 by a heat radiation structure H (FIG. 4) using a cooling fan 131 to be described later is disposed. At least a part of the intake port 1341 is disposed so as to hang over the protrusion portion 111 of the grip portion 110. An exhaust port 135 for discharging high-temperature air inside the main body 100 to the outside is disposed at an end portion of the main body 100 on the +X side opposite to the grip portion 110 in the X direction (left-right direction).

As shown in FIGS. 2A and 2B, a display panel 106 on which the shot image is displayed, and an operation part 102 including a button and/or a dial for the shooter to change the setting of shooting are disposed on the rear side of the main body 100. The medium lid 150 is disposed on a side surface of the −X side of the main body 100. The recording medium 141 is a recording medium that stores the shot data. As shown in FIG. 2B, by opening the medium lid 150, a medium insertion port 143*a* (insertion port) in a medium slot 143 (medium accommodation portion) to be described later is exposed, and the recording medium 141 can be inserted into and removed from the medium slot 143. The medium lid 150 is an opening and closing lid that opens and closes the medium insertion port 143*a*, and protects the recording medium 141 accommodated in the medium slot 143.

Figure 3:
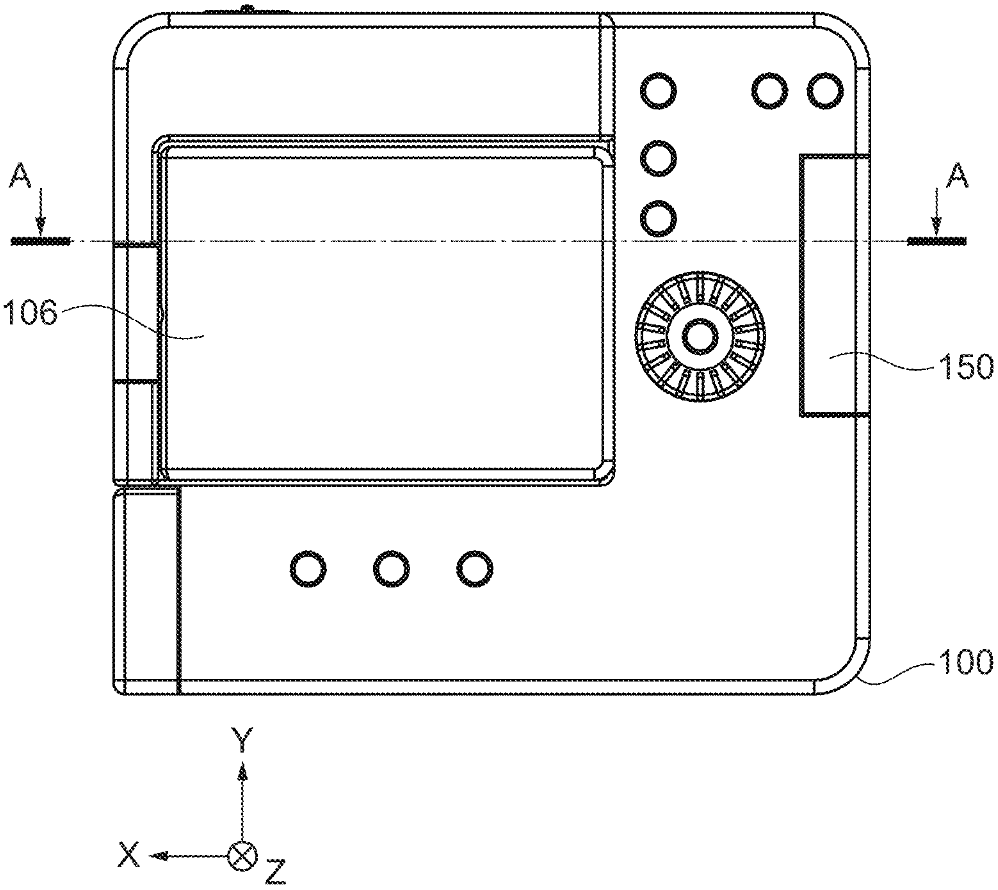
FIG. 3 is a rear view of the image pickup apparatus.
Figure 4:
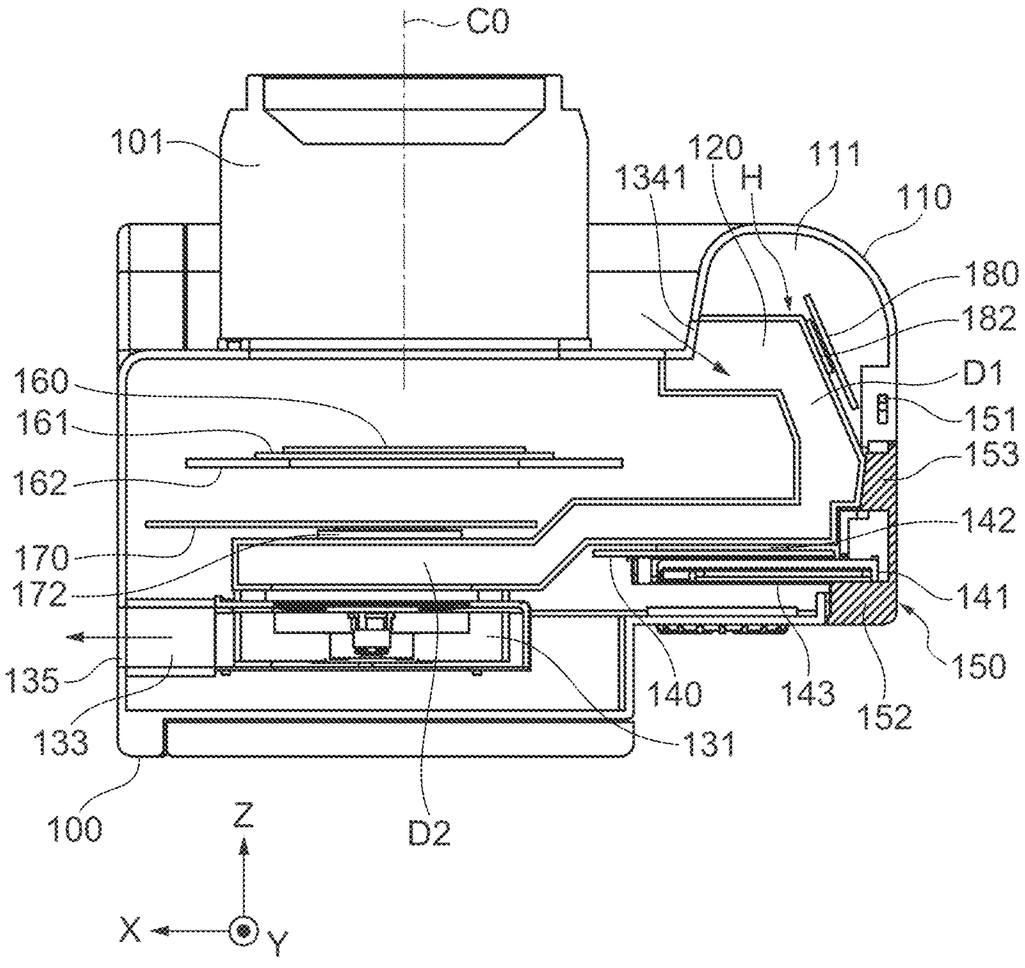
FIG. 4 is a cross-sectional view taken along the line A-A of FIG. 3.

An outline of an internal structure of the image pickup apparatus 1 will be described with reference to FIGS. 3 and 4. FIG. 3 is a rear view of the image pickup apparatus 1. FIG. 4 is a cross-sectional view taken along the line A-A of FIG. 3, and shows an X-Z cross section including the optical axis C0.

As shown in FIG. 4, an image pickup device circuit board 161, a main circuit board 170, a medium circuit board 140, and the like are disposed inside the main body 100. On the image pickup device circuit board 161, an image pickup device 160 that converts light entering from the lens 101 into an electric signal is mounted. The main circuit board 170 controls the entire image pickup apparatus 1. The medium slot 143 in which the recording medium 141 is accommodated is mounted on the medium circuit board 140.

The image pickup device circuit board 161 is fixed to a circuit board holding member 162 made of a metal. By adjusting an assembling position of the circuit board holding member 162, a lens attachment portion to which the lens 101 is attached and the image pickup device 160 can be adjusted to a desired distance.

In the main body 100, the main circuit board 170 is disposed orthogonal to the optical axis C0 on the rear side of the image pickup device circuit board 161. The medium slot 143 is disposed behind the protrusion portion 111. That is, the medium circuit board 140 is arranged on the side (−Z side) opposite to the subject side in the direction of the optical axis C0 with respect to the protrusion portion 111. This arrangement is made in consideration of convenience in layout of the components inside the main body 100 and operability of insertion/removal of the recording medium 141.

Figure 5A:
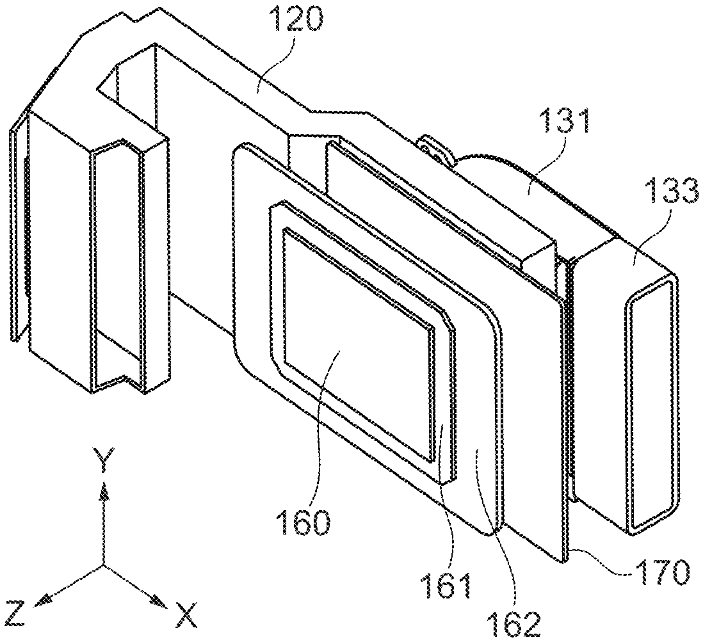
FIGS. 5A and 5B are a front-side perspective view and a front-side exploded perspective view of a heat radiation structure and its periphery, respectively.
Figure 5B:
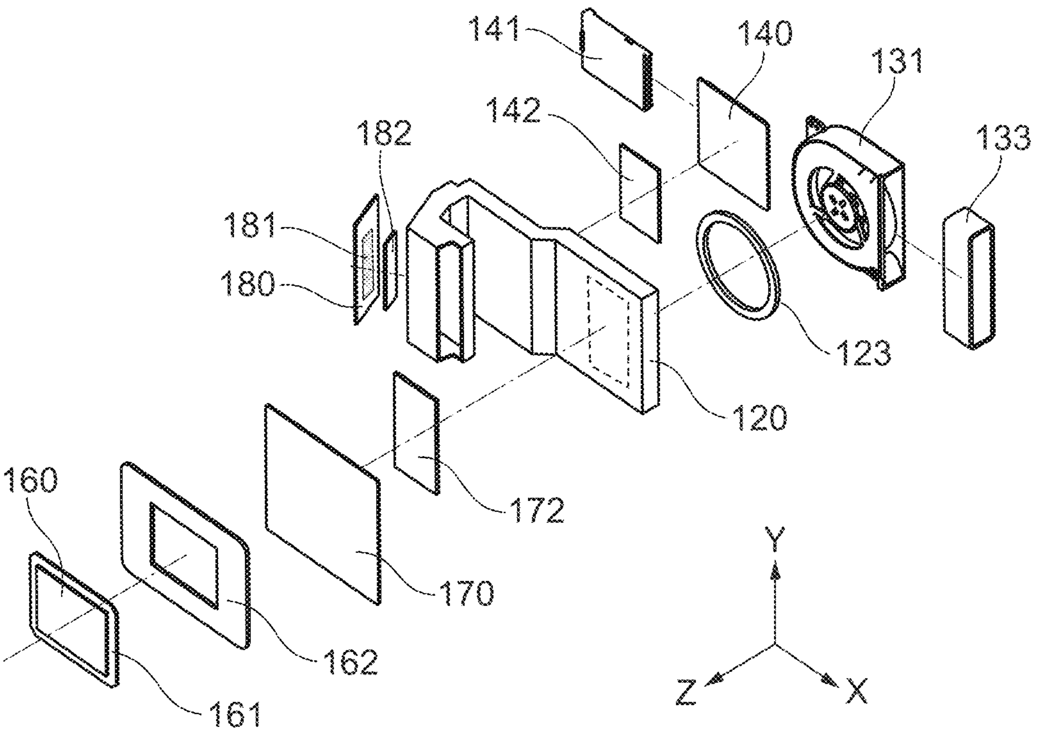
Figure 6A:
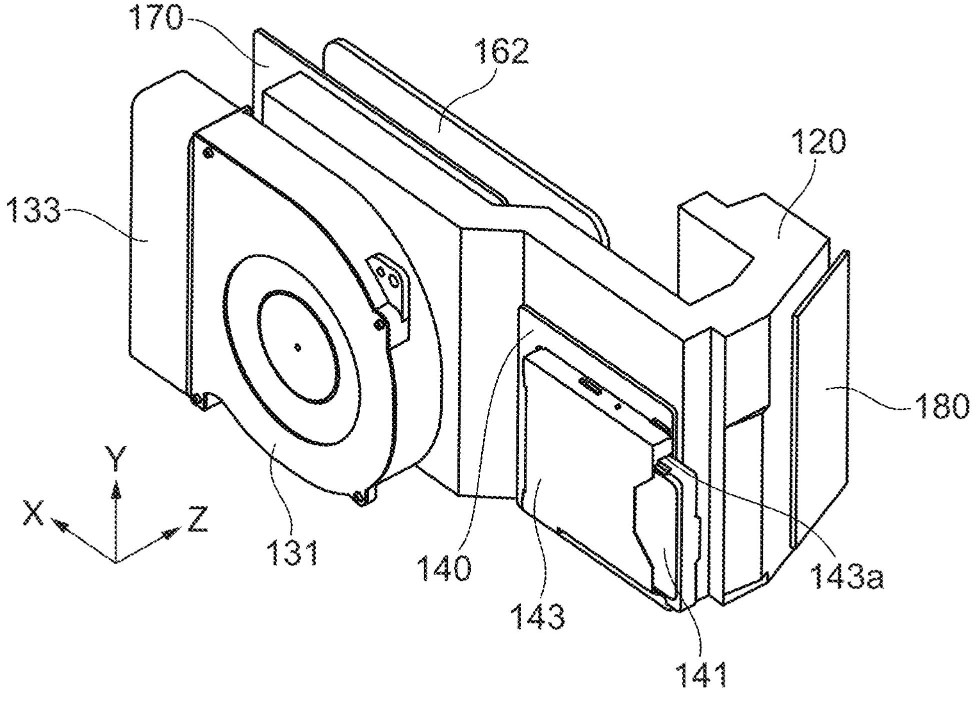
FIGS. 6A and 6B are a rear-side perspective view and a rear-side exploded perspective view of the heat radiation structure and its periphery, respectively.
Figure 6B:
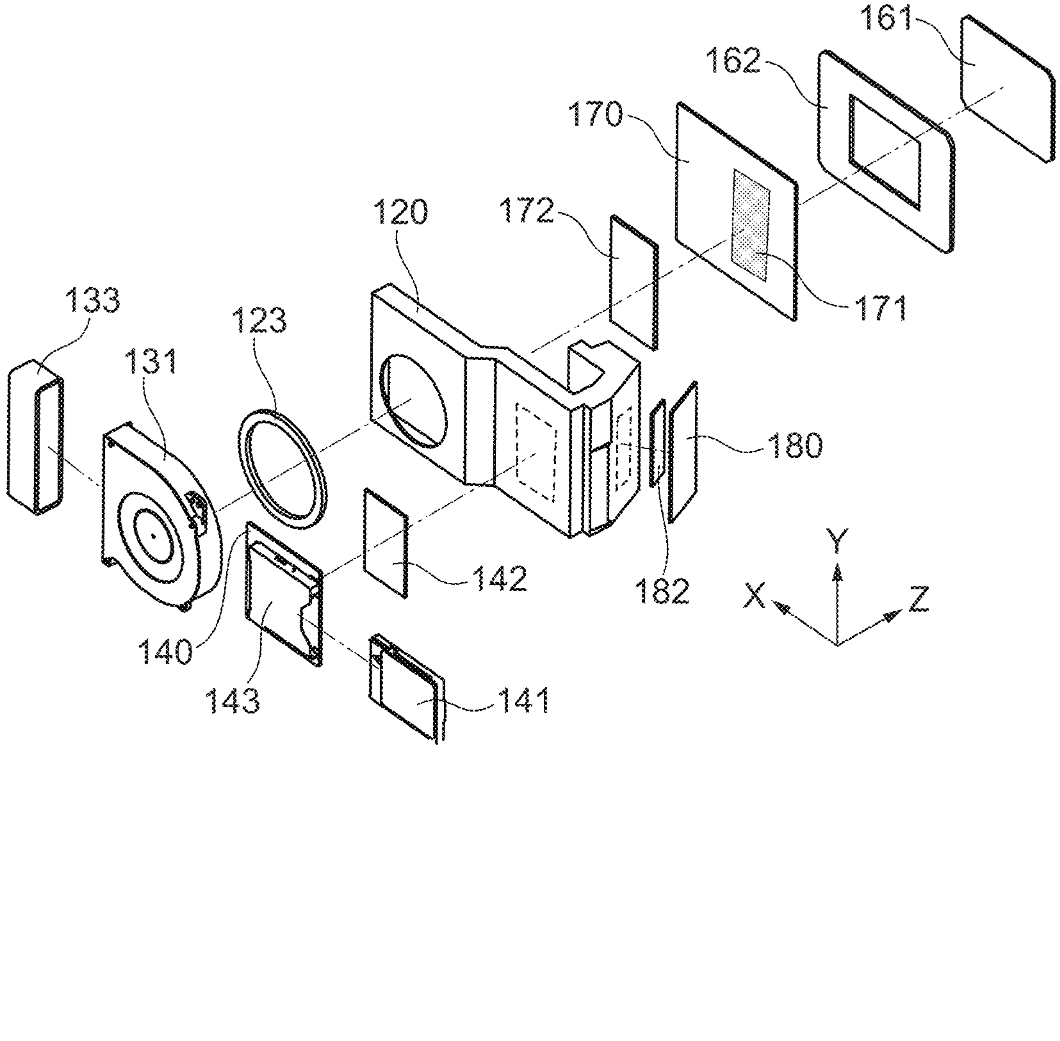

A heat radiation structure H in the main body 100 will be described with reference to FIGS. 4, 5A, 5B, 6A, and 6B. FIG. 5A is a front-side perspective view of the heat radiation structure H and its periphery, and FIG. 5B is a front-side exploded perspective view of the heat radiation structure H and its periphery. FIG. 6A is a rear-side perspective view of the heat radiation structure H and its periphery, and FIG. 6B is a rear-side exploded perspective view of the heat radiation structure H and its periphery.

During the shooting operation of the image pickup apparatus 1, an electric device mounted on the image pickup device circuit board 161 and an electric device mounted on the main circuit board 170 consume power and generate heat. In addition, the recording medium 141 also generates heat along with the recording operation of the shot data. In particular, in a case where a moving image having a high resolution and a high bit rate is shot, the power consumption in each electric device increases and the power consumption in the recording medium 141 also increases, so that each part tends to have a high temperature. Therefore, in order to prevent performance degradation of the electric device and/or the recording medium 141, a temperature rise of the exterior surface, and the like, the heat radiation structure H is provided inside the main body 100.

The heat radiation structure H includes a cooling duct 120. The cooling duct 120 is thermally connected to the medium circuit board 140 and the main circuit board 170. The cooling duct 120 includes a first extension portion D1 and a second extension portion D2. The first extension portion D1 is a portion extending parallel to the direction of the optical axis C0 in the grip portion 110 (in the grip portion). The second extension portion D2 is a portion extending along the main circuit board 170, and is substantially orthogonal to the direction of the optical axis C0. When viewed from the +Y side, the cooling duct 120 has a substantially L shape as a whole. With this shape, a long air flow path is formed to increase a surface area, and a heat radiation amount of the cooling duct 120 is improved. Furthermore, a heat transfer path from a heat generator (heat generation component or heat generation portion) inside the main body 100 to the cooling duct 120 can be simplified.

In particular, the layout is designed such that the main circuit board 170 is orthogonal to the optical axis C0, and the medium circuit board 140 is arranged at a rear portion of the grip portion 110 or behind the grip portion 110. Such a layout is advantageous in that it is easy to arrange the cooling duct 120 to be close to the main circuit board 170 and the medium circuit board 140 that require heat radiation. In the first extension portion D1, air flows mainly parallel to the direction of the optical axis C0. In the second extension portion D2, air flows mainly in a direction (+X direction) along the main circuit board 170.

The heat generation portion 171 shown in FIG. 6B is a portion where an electric device that generates heat on the main circuit board 170 is mounted. A heat conduction member 172 is disposed so as to be sandwiched between the main circuit board 170 and the cooling duct 120 in the direction of the optical axis C0. The heat conduction member 172 is in contact with the heat generation portion 171 on the front surface and is in contact with the cooling duct 120 on the rear surface, thereby efficiently transferring the heat of the main circuit board 170 to the cooling duct 120.

The heat conduction member 142 is disposed so as to be sandwiched between the medium circuit board 140 and the cooling duct 120 in the optical axis direction. The heat conduction member 142 is in contact with the cooling duct 120 on the front surface and is in contact with the medium circuit board 140 on the rear surface, thereby efficiently transferring the heat of the recording medium 141 to the cooling duct 120.

As shown in FIGS. 4 and 5B, a power supply circuit board 180 is disposed inside the grip portion 110 as a circuit board different from both the main circuit board 170 and the medium circuit board 140. The power supply circuit board 180 is disposed along the first extension portion D1 and is thermally connected to the first extension portion D1. A heat transfer path from the heat generation portion 181 of the power supply circuit board 180 to the cooling duct 120 is simply formed via the heat conduction member 182. Accordingly, the power supply circuit board 180 disposed in the grip portion 110 can be efficiently cooled.

The cooling duct 120 is formed of a metal having high thermal conductivity such as aluminum. An exhaust duct 133 is connected to the cooling fan 131 that is an air cooling fan. The cooling fan 131 introduces air into the cooling duct 120. The outside air taken in from the intake port 1341 (FIG. 4) by the cooling fan 131 flows inside the cooling duct 120. The air flowing inside the cooling duct 120 exchanges heat with the cooling duct 120 having a high temperature due to heat transfer from the heat generator to rise in temperature, and is then discharged from the cooling duct 120 to the outside through the exhaust port 135 (FIG. 4) via the exhaust duct 133.

An elastic member 123 is sandwiched between the cooling duct 120 and the cooling fan 131. As a result, it is possible to avoid foreign matters such as dust from entering the main body 100 due to leakage of air flowing through the cooling duct 120.

Next, a heat transfer path from the recording medium 141 to the cooling duct 120 will be described with reference to FIGS. 4 and 7A to 7C.

Figure 7A:
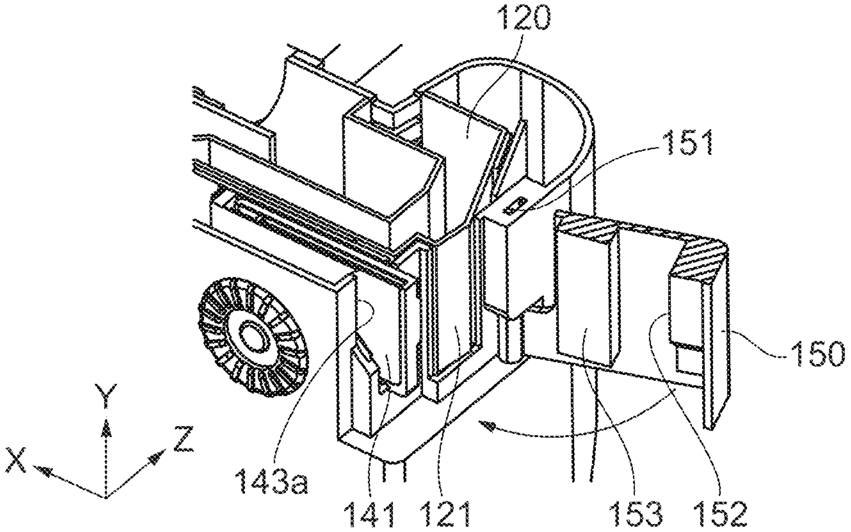
FIGS. 7A to 7C are rear-side perspective views of an end portion on the −X side in a cross section taken along the line A-A of FIG. 3.
Figure 7B:
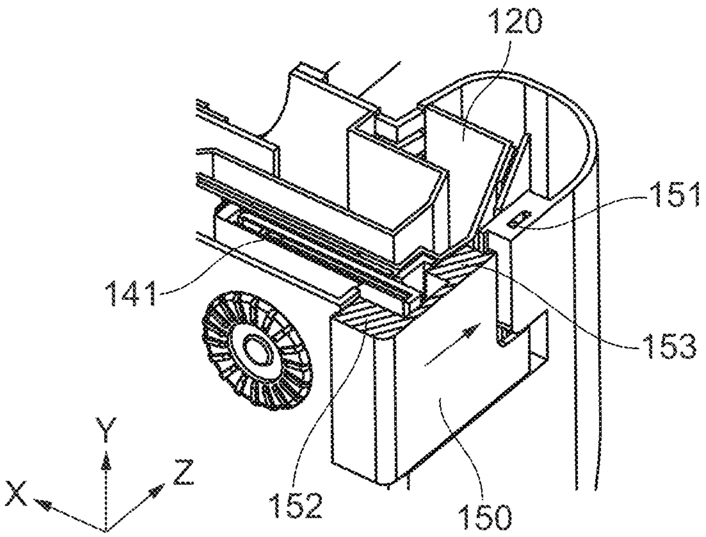
Figure 7C:
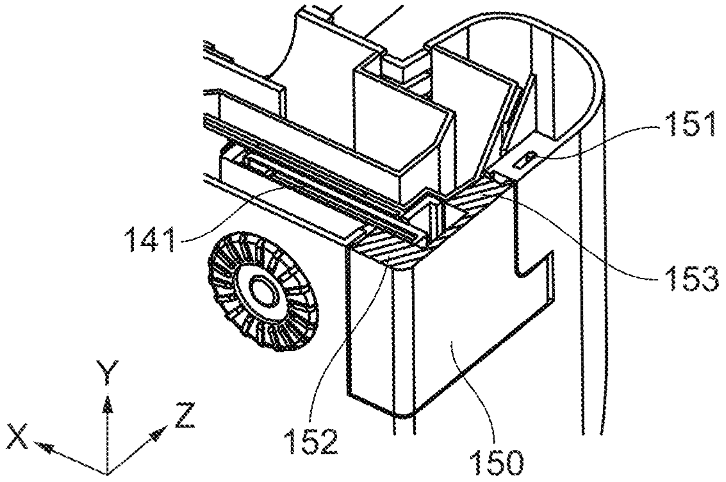

FIGS. 7A to 7C are rear-side perspective views of an end portion on the −X side in the cross section taken along the line A-A in FIG. 3. These drawings show a series of operations from an opened state to a locked state of the medium lid 150 via a closed state in a state where the recording medium 141 is inserted into the medium slot 143 of the main body 100.

FIG. 7A shows the opened state of the medium lid 150. FIG. 7B shows the closed state of the medium lid 150. FIG. 7C shows a state in which the medium lid 150 is closed with respect to the main body 100 and further locked.

The heat of the recording medium 141 is radiated by being transferred to the cooling duct 120 via the medium circuit board 140 (FIG. 4) on which the medium slot 143 is mounted. Here, if a direct heat transfer path from the recording medium 141 to the cooling duct 120 can be configured, a heat radiation effect can be further enhanced. However, since the recording medium 141 is inserted into and removed from the main body 100, it is necessary to configure the heat transfer path so as to reduce an influence of insertion and removal on operability and an influence of repeated insertion and removal on durability. Therefore, in the present embodiment, a method is adopted in which a heat transfer path from the recording medium 141 to the cooling duct 120 is configured via the medium lid 150.

As shown in FIG. 7A, in a state where the medium lid 150 is opened, the medium insertion port 143*a* of the medium slot 143 is opened, and the recording medium 141 can be inserted into/removed from the medium slot 143. In this state, a duct side surface 121 that is a part of a side surface of the −X side of the cooling duct 120 is exposed.

The medium lid 150 is rotatably supported about a rotation shaft 151 with respect to the main body 100. As shown in FIG. 7B, the recording medium 141 is covered and protected by the medium lid 150 being rotated about the rotation shaft 151 and closed. Then, the medium lid 150 in the closed state is slid in the +Z direction together with the rotation shaft 151 to be locked with respect to the main body 100 by a lock mechanism (not shown) (FIG. 7C). In this locked state, the medium lid 150 does not rotate in an opening direction.

As shown in FIG. 7C, when the medium lid 150 is in the locked state, a contact portion 152 of the medium lid 150 is in contact with the rear surface of the recording medium 141, and a contact portion 153 is in contact with the duct side surface 121 (FIG. 7A) of the cooling duct 120. As a result, a heat transfer path from the recording medium 141 to the cooling duct 120 via the medium lid 150 is formed. It should be noted that at least the contact portions 152 and 153 of the medium lid 150 may be made of a heat conduction member.

According to the present embodiment, the cooling duct 120 includes the first extension portion D1 extending parallel to the optical axis direction, and is thermally connected to the medium circuit board 140 and the main circuit board 170. By arranging the first extension portion D1 in the grip portion 110, the first extension portion D1 can be arranged in the vicinity of the medium circuit board 140, so that heat radiation efficiency of the recording medium 141 is enhanced. In addition, since the cooling duct 120 has a substantially L shape, heat radiation performance is high, and heat is smoothly transferred from the heat generation component. Therefore, the recording medium 141 can be efficiently cooled.

In particular, even in a configuration in which the main circuit board 170 is disposed substantially orthogonal to the optical axis C0 and the medium circuit board 140 is disposed behind the protrusion portion 111, a structure for cooling the recording medium 141 can be easily realized. Moreover, since the recording medium 141 can also be cooled using the cooling duct 120 that cools the main circuit board 170, the configuration is less complicated.

Since at least a part of the intake port 1341 is disposed in the protrusion portion 111, cold air can be efficiently supplied to the first extension portion D1. From this viewpoint, the entire intake port 1341 may be disposed in the protrusion portion 111. Furthermore, since the exhaust port 135 is disposed at the end portion of the main body 100 on the side opposite to the grip portion 110 in the left-right direction, a long path from the intake port 1341 to the exhaust port 135 can be secured, which contributes to improvement of cooling efficiency.

Further, in the closed state of the medium lid 150, the contact portion 152 which is a part of the medium lid 150 comes into contact with the recording medium 141, so that the heat of the recording medium 141 can be released through the medium lid 150.

In the closed state of the medium lid 150, the contact portion 153 which is another part of the medium lid 150 comes into contact with the duct side surface 121 of the cooling duct 120, so that the heat of the air in the cooling duct 120 can be released through the medium lid 150.

Figure 8:
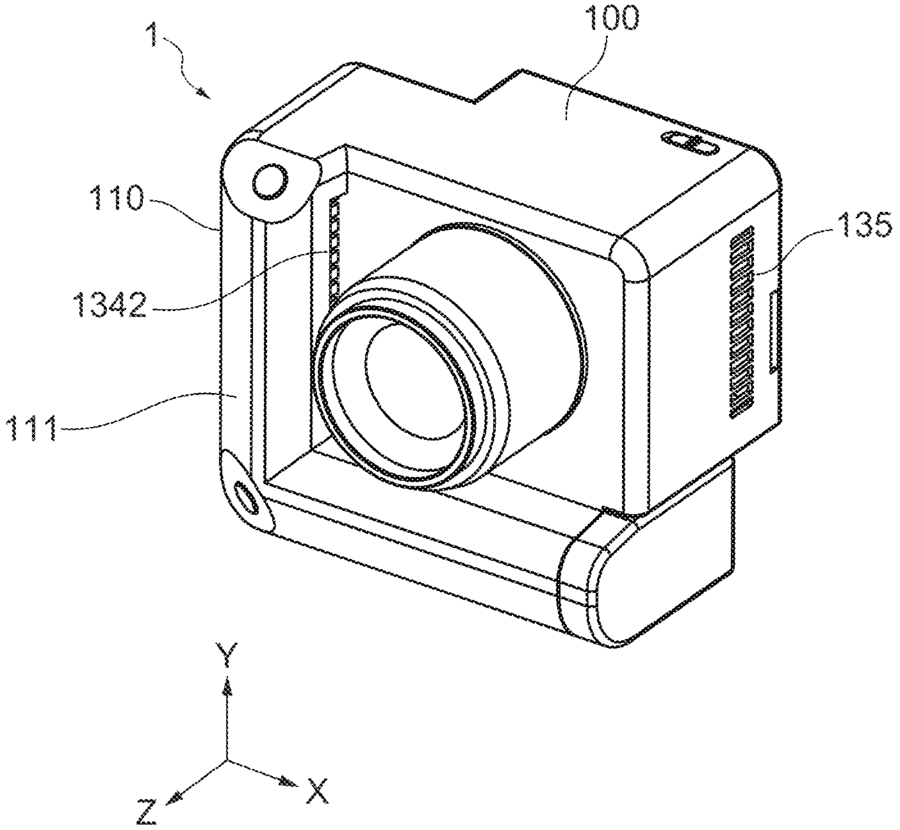
FIG. 8 is a front-side perspective view of an image pickup apparatus according to a second embodiment.
Figure 9:
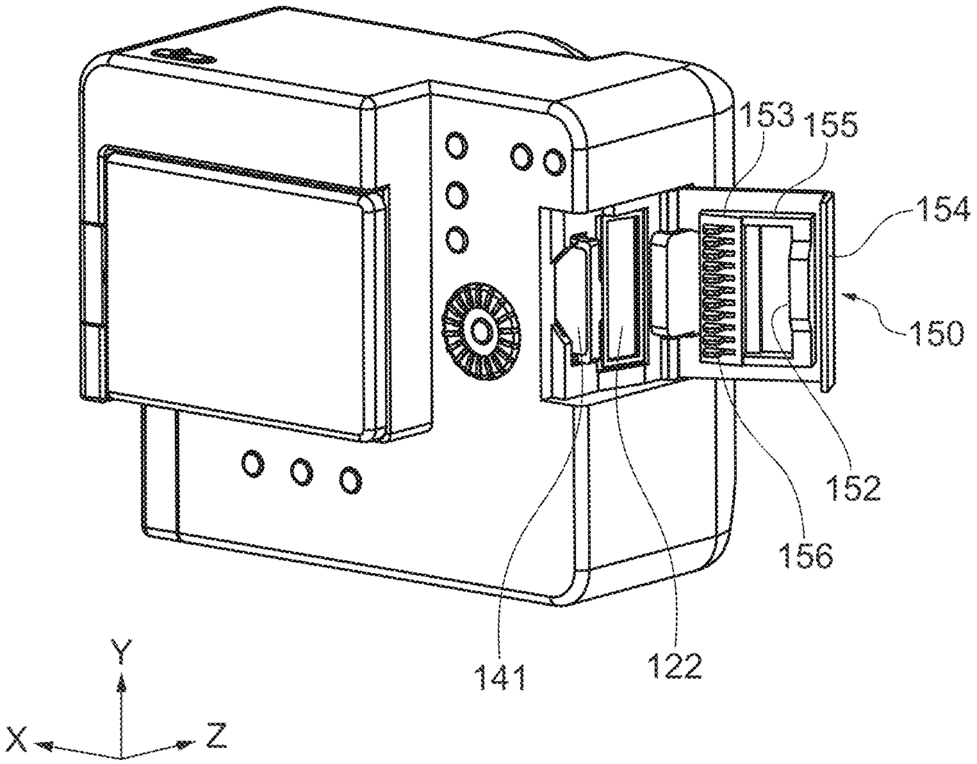
FIG. 9 is a rear-side perspective view of the image pickup apparatus according to the second embodiment.

FIG. 8 is a front-side perspective view of an image pickup apparatus according to a second embodiment of the present invention. FIG. 9 is a rear-side perspective view of the image pickup apparatus according to the second embodiment of the present invention. The second embodiment is different from the first embodiment mainly in configurations of a medium lid 150 and a cooling duct 120. Differences from the first embodiment will be mainly described.

Figure 10:
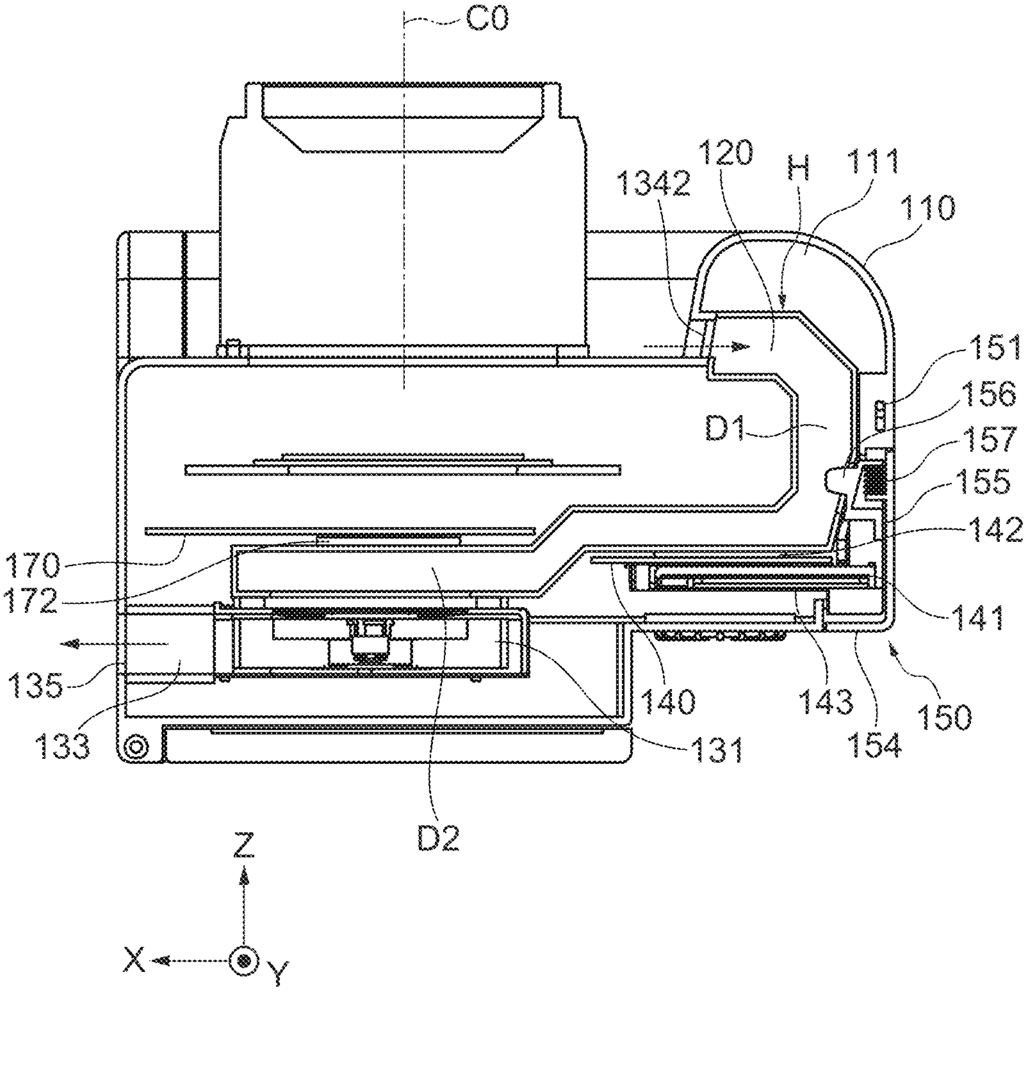
FIG. 10 is an X-Z cross-sectional view including an optical axis.

FIG. 9 shows a state in which the medium lid 150 is opened. FIG. 10 is an X-Z cross-sectional view including an optical axis C0, and is a cross-sectional view of a portion similar to that in FIG. 4.

As shown in FIGS. 8 and 10, an intake port 1342 is disposed at a position recessed to the −X side with respect to a protrusion portion 111 at the base on the +X side of the protrusion portion 111 of a grip portion 110. As a result, the intake port 1342 can be suppressed from being closed by the hand of the shooter holding the grip portion 110, and the amount of air taken into a cooling duct 120 can be secured. In addition, since the hole shape of the intake port 1342 is hardly visible even when viewed from the front side which is easily visible, the intake port 1342 can be easily disposed on the front side without deteriorating the appearance.

Figure 11A:
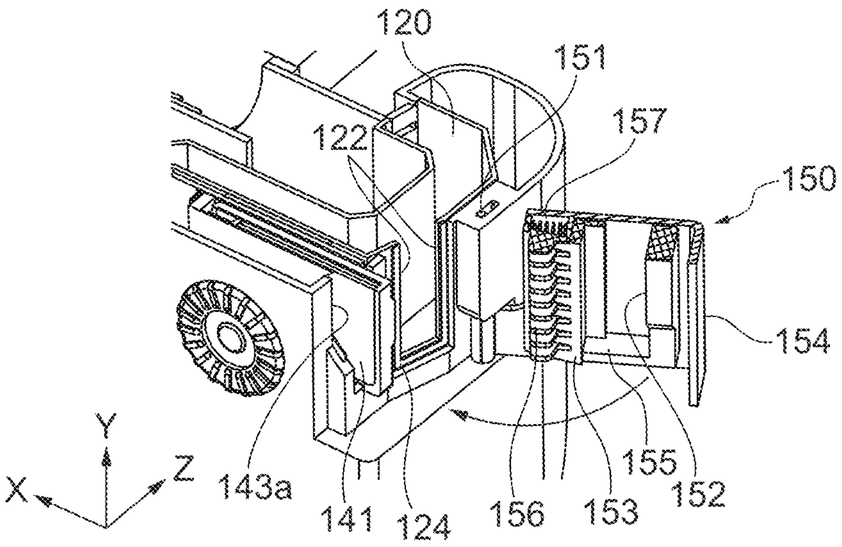
FIGS. 11A to 11C are rear-side perspective views of an end portion on the −X side in an X-Z cross section including the optical axis.
Figure 11B:
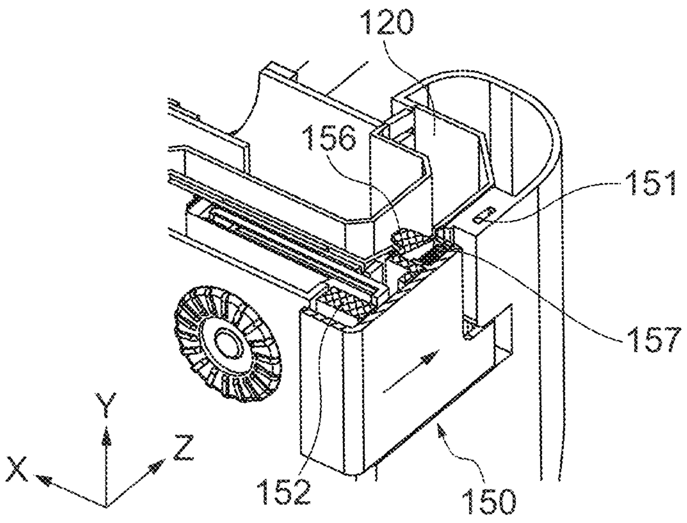
Figure 11C:
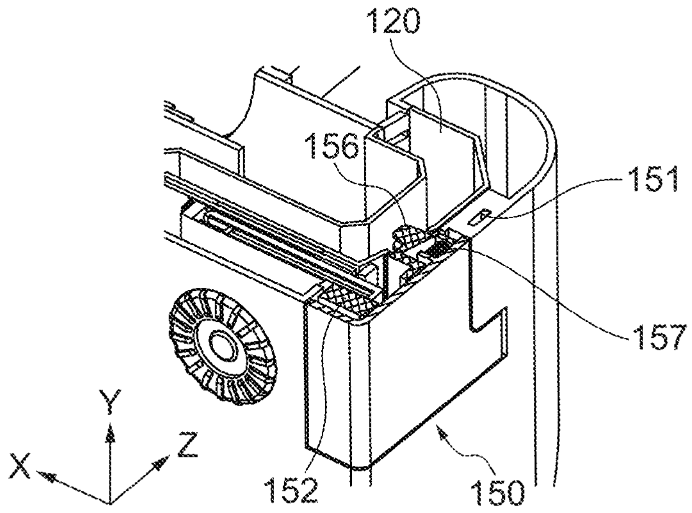
Figure 12A:
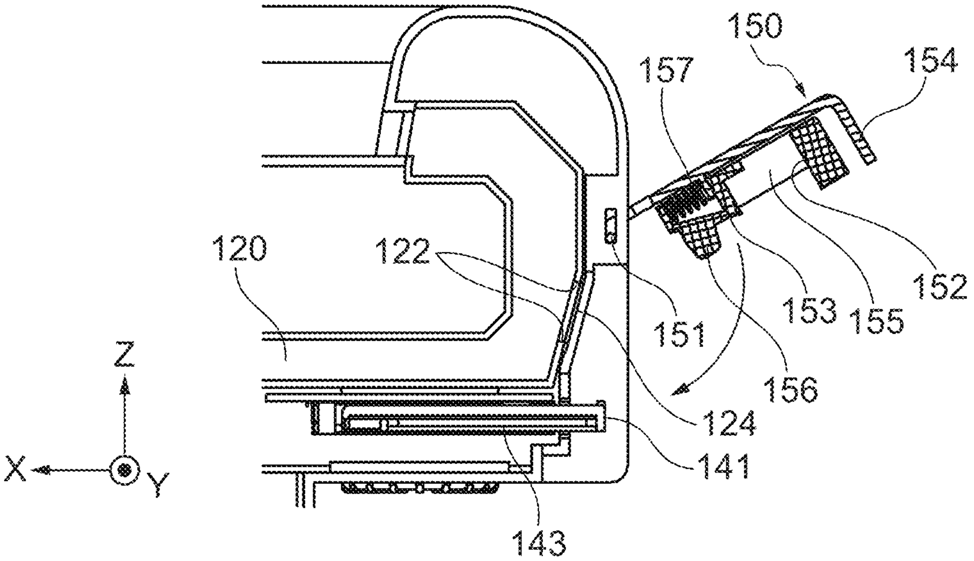
FIGS. 12A and 12B are partial views of the X-Z cross section including the optical axis.
Figure 12B:
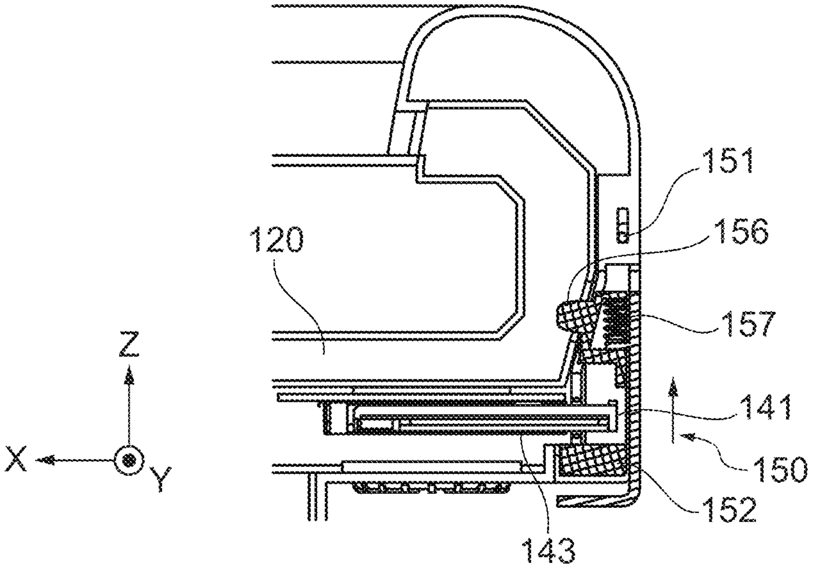
Figure 13:
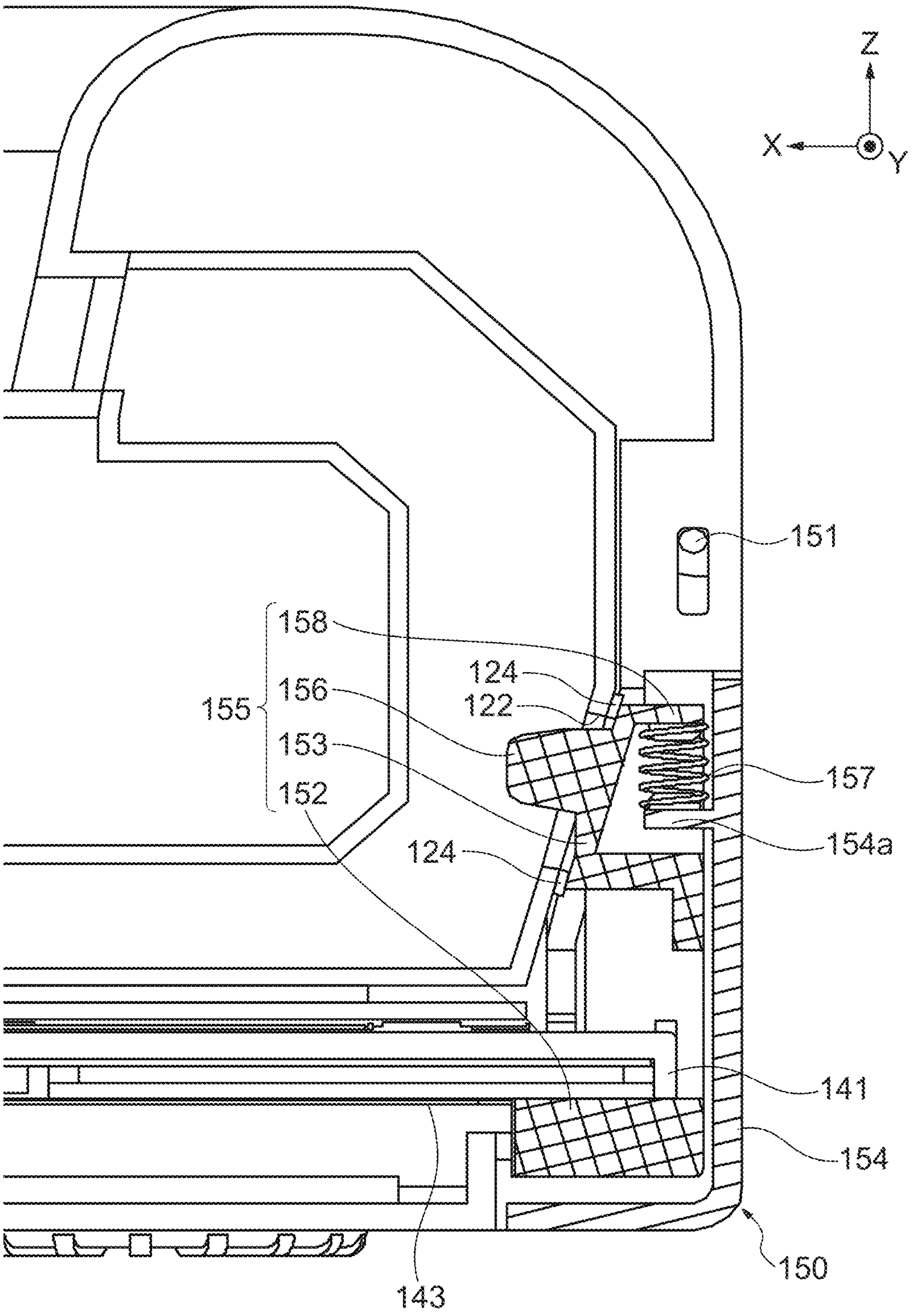
FIG. 13 is a partial view of the X-Z cross section including the optical axis.

FIGS. 11A to 11C are rear-side perspective views of an end portion of the −X-side in an X-Z cross section including the optical axis C0. FIGS. 12A, 12B, and 13 are partial views of the X-Z cross section including the optical axis C0, and a state of the medium lid 150 represented by them corresponds to a state represented by FIGS. 11A to 11C. Similarly to FIGS. 7A to 7C, FIGS. 11A to 11C and FIGS. 12A to 13 show a series of operations from an opened state to a locked state of the medium lid 150 through a closed state in a state where the recording medium 141 is inserted into the medium slot 143.

FIGS. 11A to 11C show the opened state, the closed state, and the locked state of the medium lid 150, respectively. FIGS. 12A and 12B show the opened state and the closed state of the medium lid 150, respectively, and FIG. 13 shows the locked state of the medium lid 150.

As shown in FIGS. 11A and 12A, in a state where the medium lid 150 is opened, a medium insertion port 143*a* of a medium slot 143 is opened, and the recording medium 141 can be inserted/removed. In this state, a duct hole 122 formed on a side surface of the −X side of the cooling duct 120 is exposed. The duct hole 122 communicates with an air flow path of the cooling duct 120.

As shown in FIG. 13, the medium lid 150 includes a cover member 154, a heat conduction member 155, and an elastic member 157. The elastic member 157 is, for example, a coil spring, but may be a member such as rubber. The heat conduction member 155 integrally includes a contact portion 152, a contact portion 153, a fin shape 156 (heat radiation fin), and a locking portion 158. Here, the contact portion 152 corresponds to a part of the medium lid 150, and the contact portion 153 and the fin shape 156 correspond to another part of the medium lid 150. The cover member 154 integrally includes a claw portion 154*a*. The elastic member 157 is disposed so as to be interposed between the locking portion 158 and the claw portion 154*a*. The heat conduction member 155 is supported so as to be movable in parallel in the expansion and contraction direction of the elastic member 157 relative to the cover member 154.

The medium lid 150 covers and protects the recording medium 141 by rotating about the rotation shaft 151 from the opened state shown in FIGS. 11A and 12A to the closed state (FIG. 11B and FIG. 12B). The medium lid 150 is slid in the +Z direction together with the rotation shaft 151 from the closed state to be in a locked state fixed to the main body 100 by a fixing mechanism (not shown) (FIG. 11C and FIG. 13).

That is, in a process of changing the state of the medium lid 150 from the closed state to the locked state by sliding the cover member 154 in the +Z direction, the locking portion 158 is pushed toward the +Z side by the claw portion 154*a* via the elastic member 157, whereby the entire heat conduction member 155 also moves toward the +Z side. Thereafter, when the contact portion 152 comes into contact with the recording medium 141, the movement of the heat conduction member 155 substantially stops. As the cover member 154 further slides toward the +Z side, the elastic member 157 is compressed, and thereafter, the medium lid 150 is in the locked state (FIG. 11C and FIG. 13).

In the locked state of the medium lid 150, the locking portion 158 is biased toward the +Z side by the biasing force of the elastic member 157 in the compressed state. As a result, the entire heat conduction member 155 is biased toward the +Z side, so that the contact portion 152 is in pressure contact with the −Z side surface of the recording medium 141. Therefore, the heat is reliably transferred from the recording medium 141 to the heat conduction member 155.

In the locked state of the medium lid 150, the contact portion 153 closes the duct hole 122, and the fin shape 156 is inserted into the air flow path of the cooling duct 120 through the duct hole 122. As a result, the heat of the air in the cooling duct 120 can be released through the medium lid 150. It should be noted that a cushion 124 (FIG. 12A and FIG. 13) is attached to the periphery of the duct hole 122. In the locked state of the medium lid 150, the cushion 124 is sandwiched between the periphery of the duct hole 122 and the contact portion 153, so that air leakage from the duct hole 122 is prevented.

According to the second embodiment, regarding efficient cooling of the recording medium 141, effects similar to those of the first embodiment can be obtained. Further, since a heat transfer path from the recording medium 141 to the cooling duct 120 via the medium lid 150 is formed, the cooling efficiency of the recording medium 141 can be further enhanced.

Figure 14:
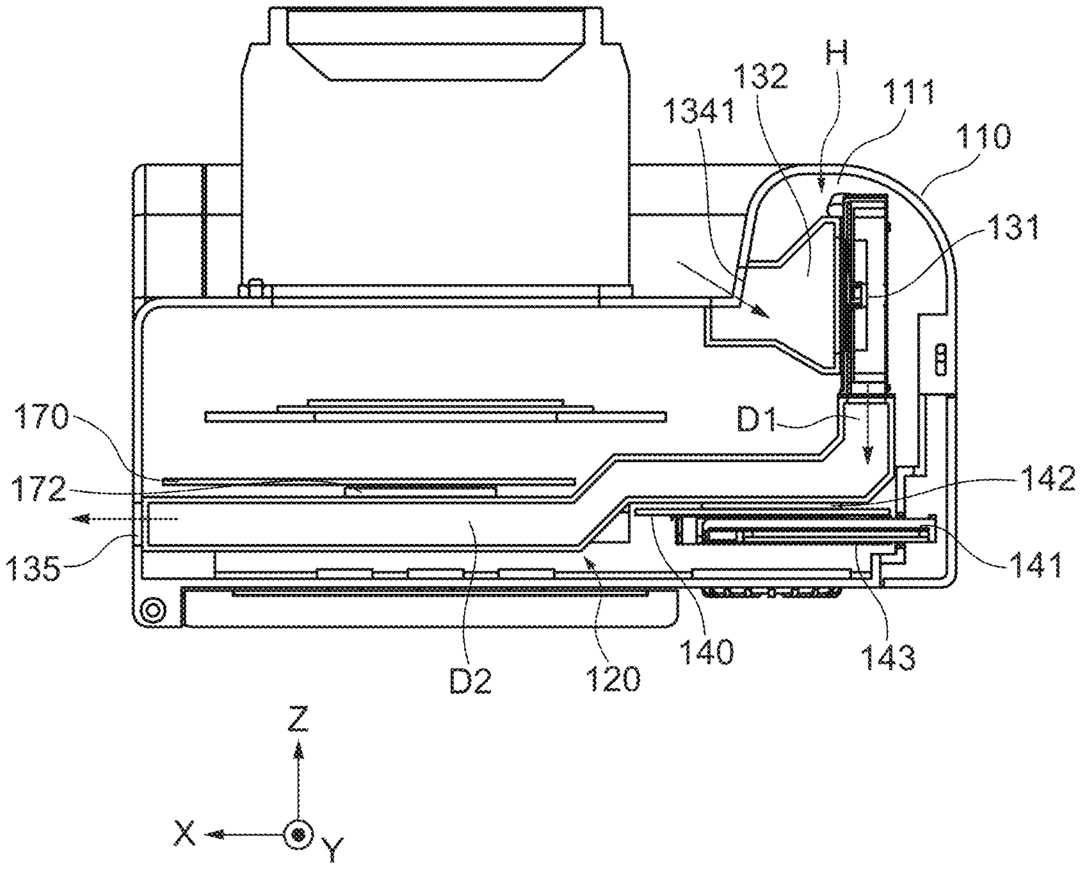
FIG. 14 is an X-Z cross-sectional view including an optical axis of an image pickup apparatus according to a third embodiment.

An image pickup apparatus according to a third embodiment of the present invention will be described. FIG. 14 is an X-Z cross-sectional view including an optical axis C0 of the image pickup apparatus according to the third embodiment, and is a cross-sectional view of a portion similar to that in FIG. 4. The third embodiment is different from the first embodiment mainly in that an arrangement of a cooling fan 131 is different.

As shown in FIG. 14, the cooling fan 131 is disposed such that a part thereof enters the inside of a protrusion portion 111 of a grip portion 110. Here, as in an image pickup apparatus 1 of the first embodiment, in an apparatus in which the grip portion 110 is integrally provided at one end portion of a main body 100 and a main circuit board 170 is disposed orthogonal to the optical axis C0, a dimension in a Z direction is small and a dimension in an X direction is large in many cases. Here, in a case where the cooling fan 131 is mounted on the main body 100, if the cooling fan 131 and the main circuit board 170 are arranged so as to overlap each other in the Z direction, the dimension in the Z direction increases.

Therefore, in the third embodiment, by disposing a part of the cooling fan 131 inside the protrusion portion 111, it is possible to mount the cooling fan 131 inside the main body while suppressing the dimension increase of the image pickup apparatus in the Z direction.

The outside air taken in from an intake port 1341 by the cooling fan 131 passes through an intake duct 132, and then flows and passes through the cooling fan 131 and the cooling duct 120 in this order. The flowing air exchanges heat with the cooling duct 120 having a high temperature by heat transfer from a heat generator, rises in temperature, and is then discharged to the outside from an exhaust port 135.

According to the third embodiment, regarding efficient cooling of a recording medium 141, effects similar to those of the first embodiment can be obtained. In addition, since a part of the cooling fan 131 enters the inside of the protrusion portion 111, it is possible to suppress an increase in the dimension of the image pickup apparatus in the Z direction. It should be noted that, in the present embodiment, the same configuration as any of the first and second embodiments may be adopted for a configuration other than the arrangement of the cooling fan 131.

In each of the above embodiments, with respect to a positional relation between the main circuit board 170 and the cooling duct 120 in the Z direction, the cooling duct 120 is disposed on the −Z side with respect to the main circuit board 170. However, instead of this, the cooling duct 120 may be disposed on the +Z side with respect to the main circuit board 170. Regarding the arrangement of the intake ports 1341 and 1342, in each of the above embodiments, the intake ports are arranged at the base on the +X side of the protrusion portion 111 of the grip portion 110. However, the intake ports 1341 and 1342 may be provided at the tip or on the −X side of the protrusion portion 111, and may be disposed closer to one of the top surface side and the bottom surface side in the Y direction.

It should be noted that, in each embodiment, what is denoted by "substantially" is not intended to exclude completeness. For example, "substantially orthogonal" and "substantially L-shaped" include completely orthogonal and substantially L-shaped, respectively.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-143083, filed Sep. 4, 2023, which is hereby incorporated by reference wherein in its entirety.

What is claimed is:

1. An image pickup apparatus comprising:
- a grip portion including a protrusion portion protruding toward a subject side in an optical axis direction of the image pickup apparatus, the grip portion being provided at an end portion of a main body;
- a medium circuit board on which a medium accommodation portion for accommodating a recording medium is mounted, the medium circuit board being disposed behind the protrusion portion in the optical axis direction;
- a main circuit board disposed substantially orthogonal to the optical axis;
- a cooling duct including a first extension portion, the cooling duct being thermally connected to the medium circuit board and the main circuit board; and
- an air cooling fan configured to introduce air into the cooling duct,
- wherein the first extension portion is located in the grip portion between the protrusion portion and the medium circuit board, and extends in a direction substantially parallel to the optical axis direction, and
- wherein a part of the air cooling fan is disposed in the protrusion portion.

2. The image pickup apparatus according to claim 1, wherein
- the cooling duct includes a second extension portion extending along the main circuit board, and
- air flows substantially parallel to the optical axis direction in the first extension portion, and air flows in a direction along the main circuit board in the second extension portion.

3. The image pickup apparatus according to claim 1, further comprising
- an intake port through which air is introduced into the cooling duct; and
- an exhaust port through which air is discharged from the cooling duct, wherein at least a part of the intake port is disposed in the protrusion portion, and the exhaust port is disposed at an end portion of the main body on a side opposite to a side where the grip portion is disposed in a left-right direction of the main body.

4. The image pickup apparatus according to claim 1, further comprising
- an intake port through which air is introduced into the cooling duct, wherein the intake port is disposed at a position recessed with respect to the protrusion portion.

5. The image pickup apparatus according to claim 1, further comprising a circuit board different from both the medium circuit board and the main circuit board, wherein the different circuit board is disposed along the first extension portion and is thermally connected to the first extension portion.

6. The image pickup apparatus according to claim 1, further comprising an opening and closing lid configured to open and close an insertion port in the medium accommodation portion, wherein a part of the opening and closing lid is brought into contact with the recording medium in a closed state of the opening and closing lid.

7. The image pickup apparatus according to claim 6, wherein another part of the opening and closing lid is brought into contact with and/or inserted into the cooling duct in a locked state of the opening and closing lid.

8. The image pickup apparatus according to claim 6, wherein the part of the opening and closing lid is formed of a heat conduction member.

9. The image pickup apparatus according to claim 7, wherein the other part of the opening and closing lid is formed of a heat conduction member.

10. The image pickup apparatus according to claim 7, wherein the other part of the opening and closing lid inserted into the cooling duct is a heat radiation fin provided on the opening and closing lid.

11. The image pickup apparatus according to claim 6, wherein the opening and closing lid include a cover member, a heat conduction member movable with respect to the cover member, and an elastic member interposed between the cover member and the heat conduction member, the part of the opening and closing lid is included in the heat conduction member, and in a locked state of the opening and closing lid, the part of the opening and closing lid is brought into pressure contact with the recording medium by a biasing force of the elastic member.

* * * * *